US 6,637,715 B2
Oct. 28, 2003

(54) VEHICULAR EXTERIOR BREAK-AWAY MIRROR ASSEMBLY

(75) Inventor: Steven G. Hoek, Holland, MI (US)

(73) Assignee: Donnelly Corporation, Holland, MI (US)

( * ) Notice: Subject to any disclaimer, the term of this patent is extended or adjusted under 35 U.S.C. 154(b) by 90 days.

(21) Appl. No.: 09/928,806

(22) Filed: Aug. 13, 2001

(65) Prior Publication Data

US 2002/0048100 A1 Apr. 25, 2002

Related U.S. Application Data

(60) Provisional application No. 60/225,128, filed on Aug. 14, 2000.

(51) Int. Cl.[7] ............................................... A47G 1/16
(52) U.S. Cl. ...................................... 248/476; 248/478
(58) Field of Search ............................. 248/549, 900, 248/476, 466, 475.1, 477, 478, 479, 486, 487; 359/841; 403/92, 93, 94, 84

(56) References Cited

U.S. PATENT DOCUMENTS

| | | | | |
|---|---|---|---|---|
| 4,135,694 A | | 1/1979 | Stegenga et al. ............ 248/478 |
| 4,523,735 A | * | 6/1985 | Beck et al. ................. 248/476 |
| 4,626,085 A | * | 12/1986 | Suzuki ....................... 350/604 |
| 4,692,000 A | | 9/1987 | Wada et al. ................ 350/637 |
| 4,789,232 A | * | 12/1988 | Urbanek ..................... 350/632 |
| 5,005,797 A | | 4/1991 | Maikawa et al. ........... 248/479 |
| 5,268,795 A | * | 12/1993 | Usami ........................ 359/841 |
| 5,557,476 A | * | 9/1996 | Oishi ......................... 359/841 |
| 5,639,054 A | * | 6/1997 | Gerndt et al. .............. 248/478 |
| 5,669,698 A | | 9/1997 | Veldman et al. ........... 362/83.1 |
| 5,678,945 A | * | 10/1997 | Fimeri ........................ 403/92 |
| 5,879,074 A | * | 3/1999 | Pastrick ...................... 362/494 |
| 5,900,999 A | | 5/1999 | Huizenga et al. .......... 359/877 |
| 5,903,402 A | | 5/1999 | Hoek ......................... 359/841 |
| 5,949,591 A | | 9/1999 | Whitehead ................. 359/841 |
| 5,986,364 A | | 11/1999 | Bingle et al. .............. 310/51 |
| 6,037,689 A | | 3/2000 | Bingle et al. .............. 310/89 |
| 6,094,027 A | | 7/2000 | Willmore et al. .......... 318/652 |
| 6,113,241 A | | 9/2000 | Hoek ......................... 359/841 |
| 6,116,743 A | | 9/2000 | Hoek ......................... 359/871 |
| 6,125,509 A | * | 10/2000 | Hartigan et al. ........... 16/337 |
| 6,132,052 A | | 10/2000 | Huizenga et al. .......... 359/877 |
| 6,149,287 A | | 11/2000 | Pastrick et al. ............ 362/494 |
| 6,168,279 B1 | | 1/2001 | Schnell ...................... 359/872 |
| 6,213,612 B1 | | 4/2001 | Schnell et al. ............. 359/877 |
| 6,239,928 B1 | | 5/2001 | Whitehead et al. ........ 359/871 |
| 6,243,218 B1 | | 6/2001 | Whitehead ................. 359/877 |

* cited by examiner

*Primary Examiner*—Ramon O. Ramirez
*Assistant Examiner*—Kofi Schulterbrandt
(74) *Attorney, Agent, or Firm*—Van Dyke, Gardner, Linn & Burkhart, LLP

(57) ABSTRACT

A break-away vehicle exterior rearview mirror system which is suitable for use in a vehicle, includes an exterior rearview mirror assembly including a movable portion and a fixed portion, which is adapted for mounting the movable portion to a vehicle. The movable portion includes a reflective element housed in a movable portion. An exterior rearview mirror assembly further includes a pivot member with the movable portion being pivotally mounted to the fixed portion by the pivot member for pivoting about a pivot axis from a normal operating position to a break-away position closer to the side of the vehicle. The fixed portion includes a first engagement element, with the movable portion including a second engagement element. Either the movable portion or the fixed portion generates resilient force, with the engagement elements being urged into releasable engagement with each other by the resilient force to thereby engage the movable portion with the fixed portion about the pivot axis. The second engagement element releases from the first engagement element to permit the movable portion to pivot about the pivot axis when an external force having sufficient magnitude is applied to the movable portion to overcome the resilient force, which is generated by the movable portion or the fixed portion. In addition, one of the engagement elements flexes when external force is applied to the movable portion.

44 Claims, 9 Drawing Sheets

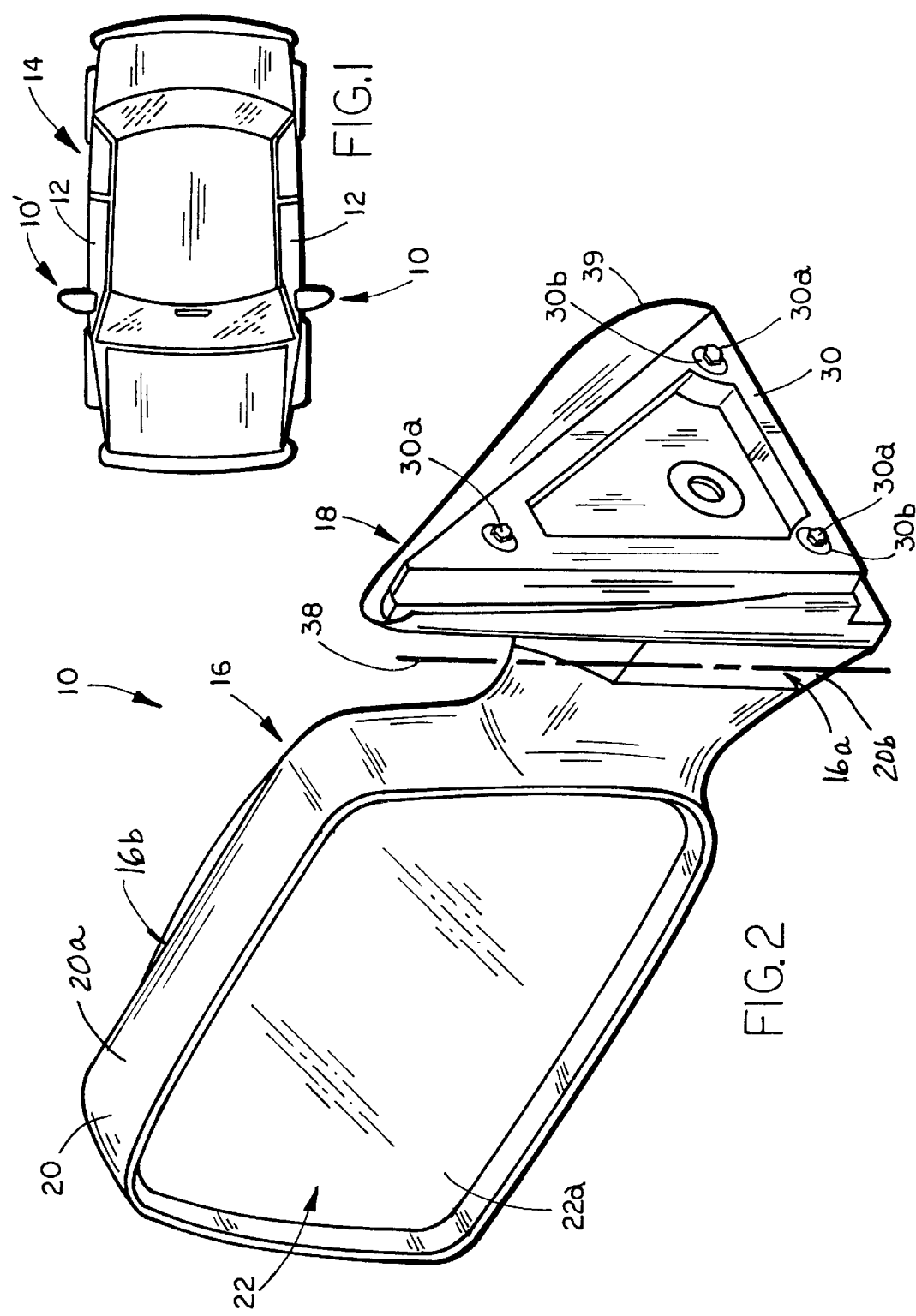

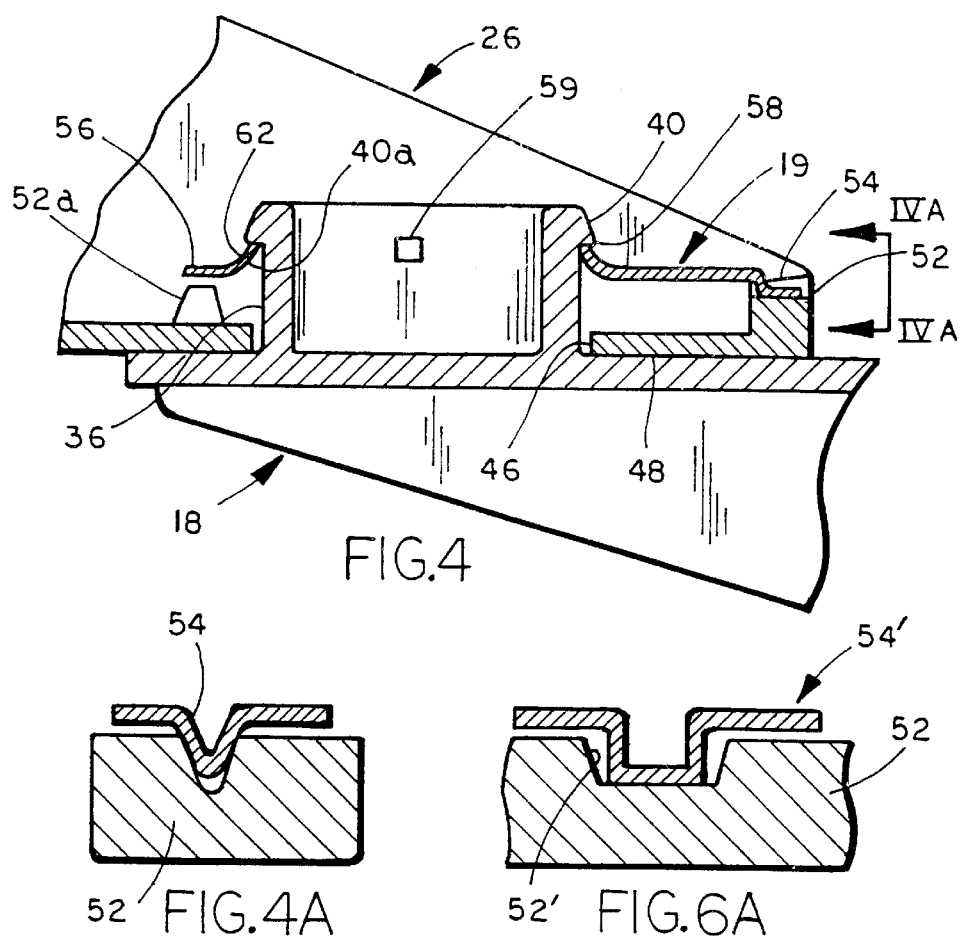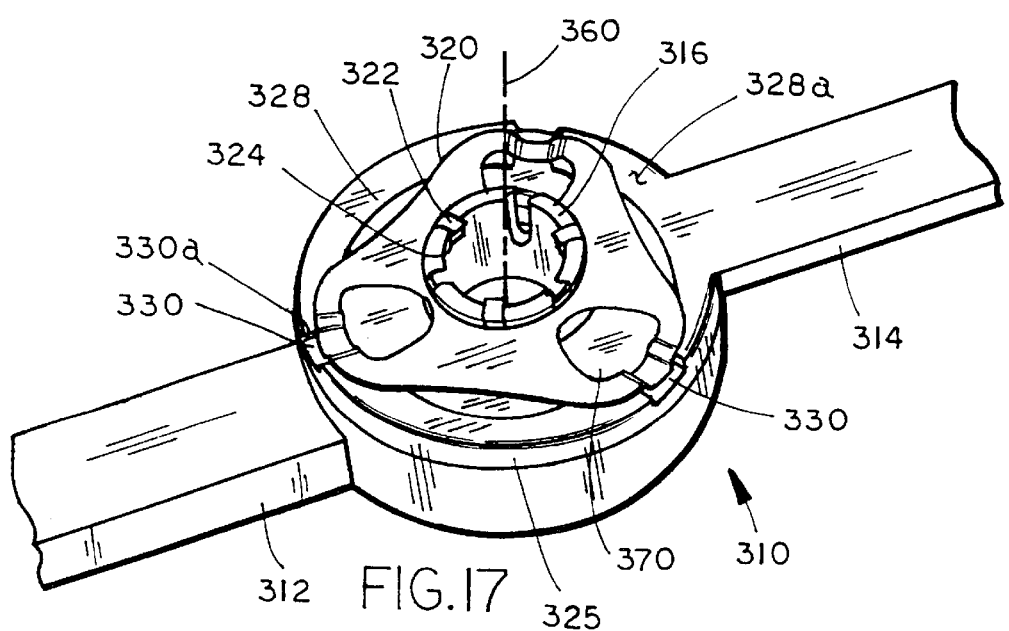

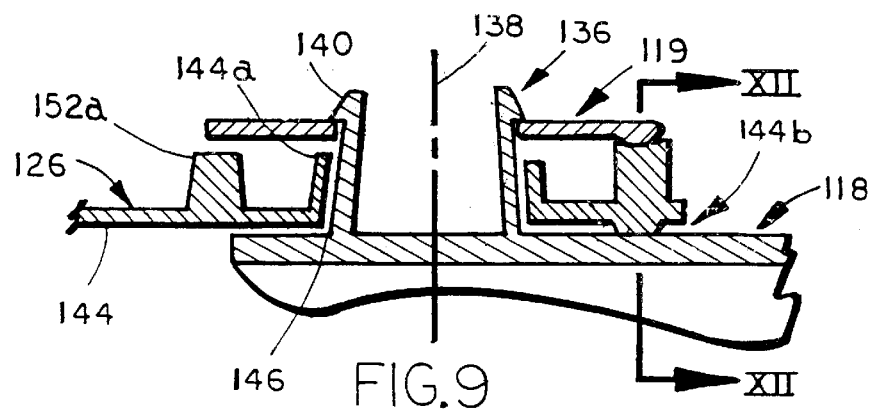
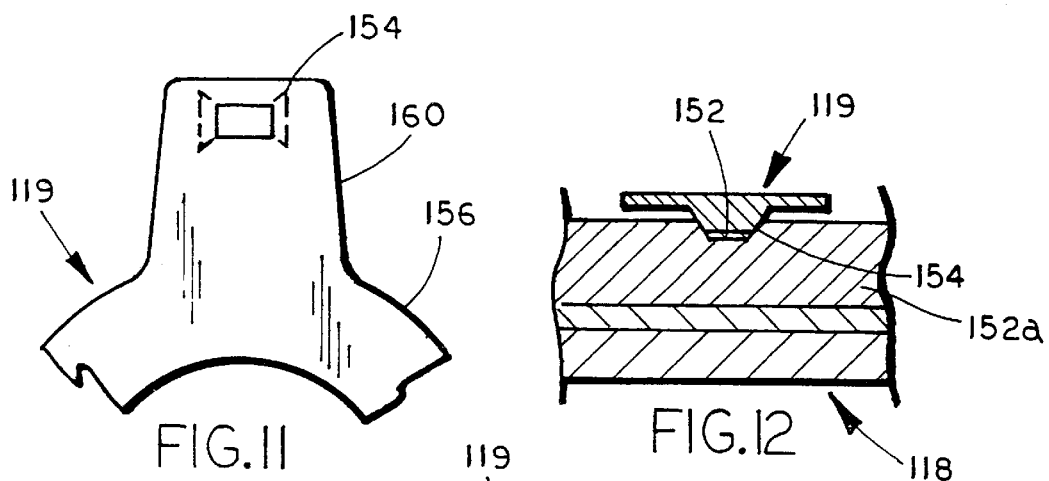
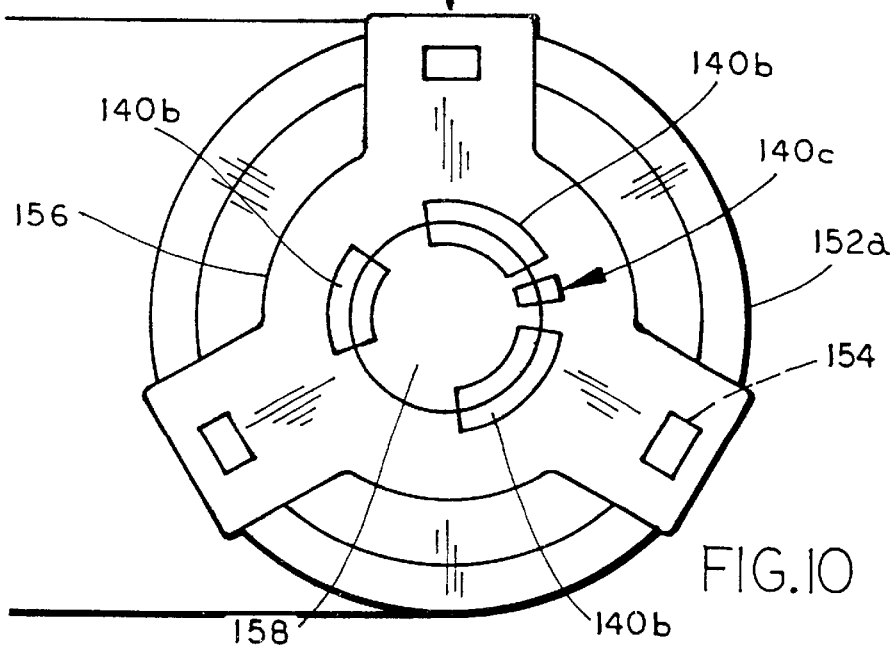

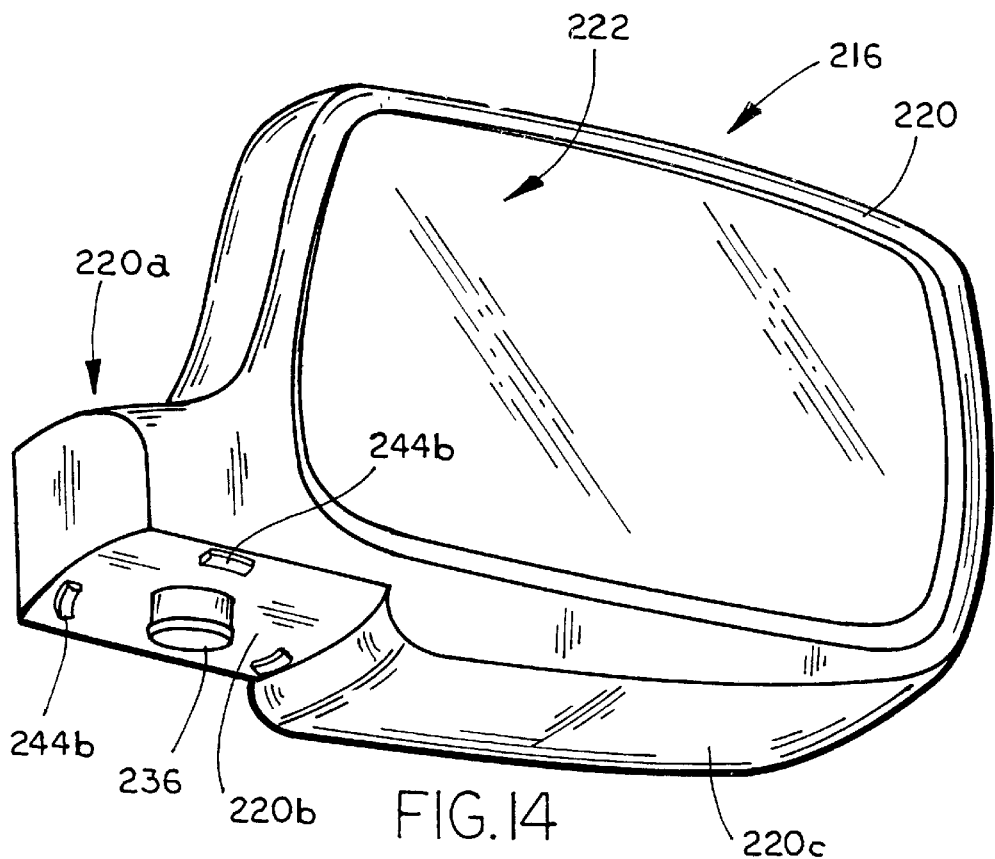
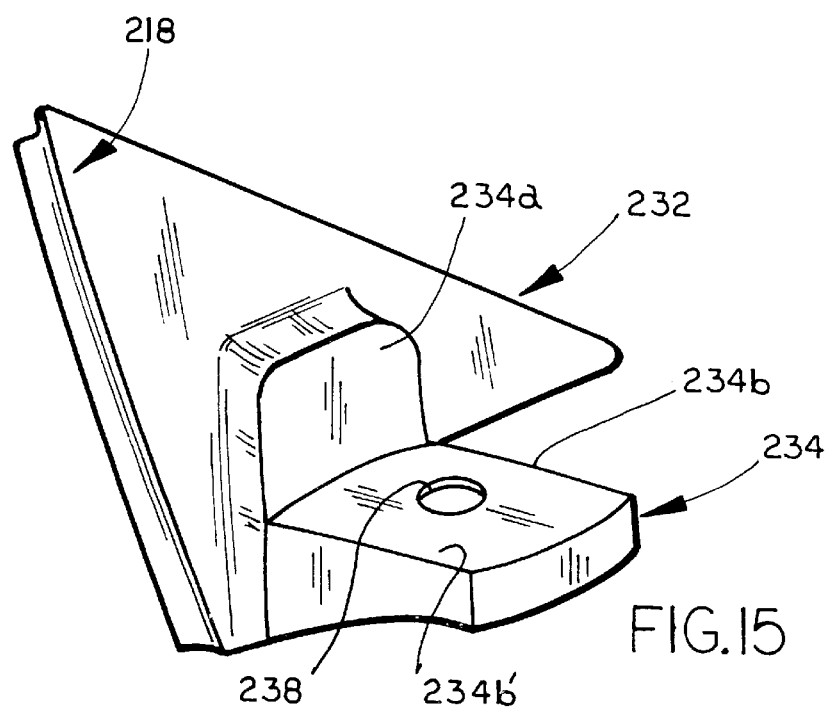

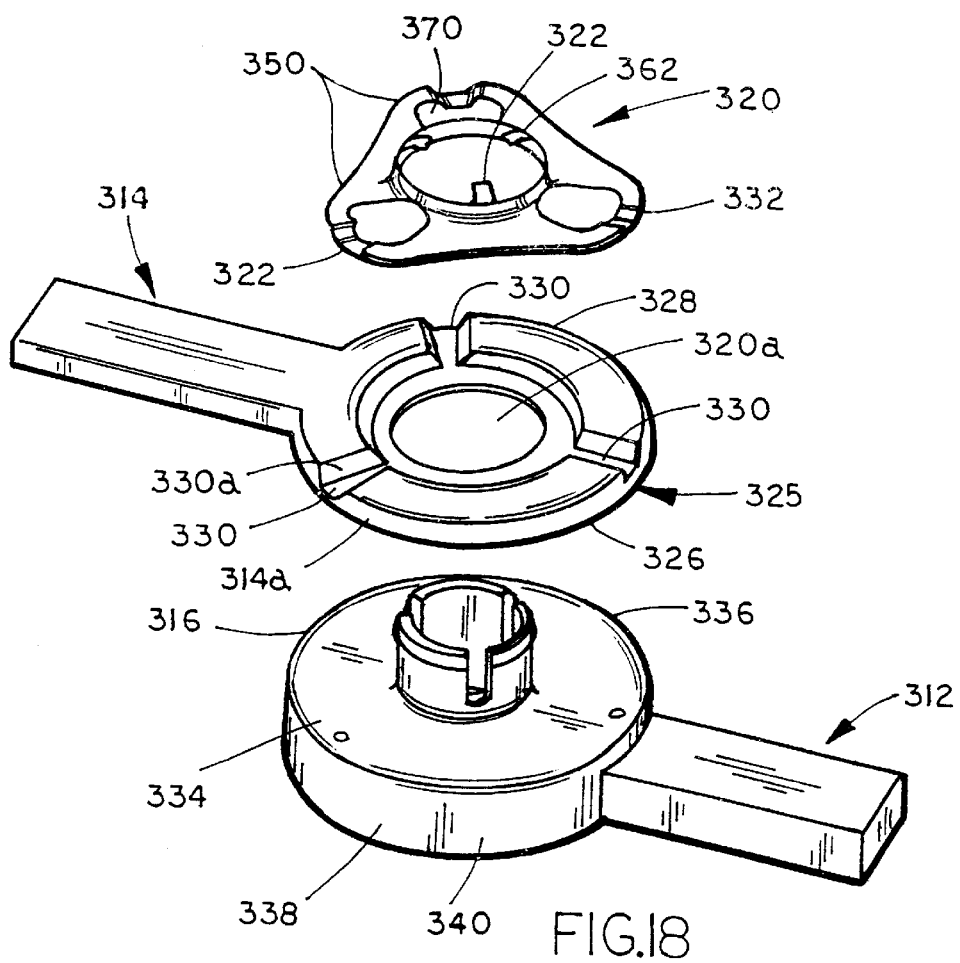
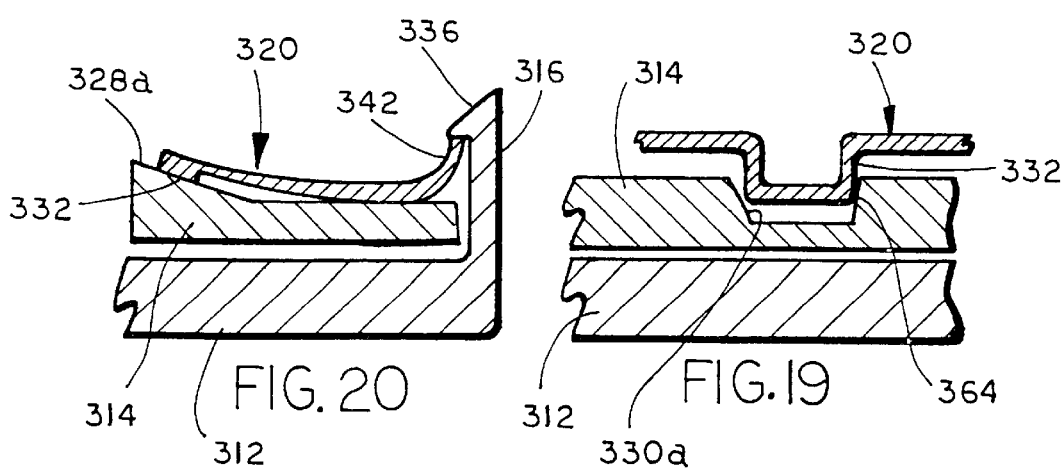

VEHICULAR EXTERIOR BREAK-AWAY MIRROR ASSEMBLY

This application incorporates by reference herein in its entirety pending U.S. provisional application entitled VEHICULAR EXTERIOR BREAK-AWAY MIRROR ASSEMBLY, Ser. No. 60/225,128, filed on Aug. 14, 2000 (Attorney Docket No. DON01 P-833).

TECHNICAL FIELD AND BACKGROUND OF THE INVENTION

The present invention relates to an exterior rearview mirror assembly for mounting on a vehicle and, more particularly, to a break-away exterior rearview mirror system which includes a movable portion that moves between a normal operating position, in which the occupant of the vehicle has a rearward field of view, and a folded, retracted position in which the mirror assembly is folded in toward the body of the vehicle when an external force is applied to the mirror assembly.

Conventional exterior rearview mirror assemblies include a housing with a reflective element supported in the housing and a mounting bracket for mounting to the vehicle. To minimize the damage to the exterior rearview mirror assembly in the event of an impact with the mirror housing, auto manufacturers have designed mirror assemblies that fold or break-away about the mounting bracket under such an impact. This is achieved by pivotally mounting a portion of the assembly to the mounting bracket on a pivot member, which is formed or provided on the bracket. A plurality of detent assemblies releasably engage the movable portion with the mounting bracket under normal loading conditions but release the engagement to permit the movable portion to pivot on the mounting bracket when the assembly is impacted by a force having sufficient magnitude. The detent assemblies are urged into this releasable engagement by a coil spring, which is supported by the pivot member. In order to pivot the assembly about the bracket and disengage the detent assemblies, a force is required which has sufficient magnitude to compress the spring.

However, these conventional break-away devices consume a significant amount of space in the mirror assembly and often dictate or limit the styling of the mirror assembly. Furthermore, when actuated to fold, the detent assemblies, which are rigidly formed and fixed in relation to the bracket and housing, induce a separating movement between the movable portion and the bracket when the housing is pivoted to its folded position. In addition, in order to function, the contact between the movable portion and the bracket is effectively limited to the detent assemblies. As a result, the vibration performance of these mirror assemblies is not optimized and these rearview mirror assemblies tend to exhibit reduced dampening performance.

The assembly process for these conventional break-away mirror assemblies is complicated requiring the spring and the spring retainer to be assembled from the top of the mirror. In addition, because more and more exterior rearview mirror assemblies incorporate electrical components, wiring of these components has complicated the mirror assembly process and has until recently been achieved by passing the wiring through the pivot joint followed by the termination of the wires. As a result, the termination of each wire has been completed during the installation of the mirror. More recently, however, such as described in U.S. patent application entitled "MIRROR ACTUATOR ELECTRICAL CONNECTOR", filed Jan. 11, 1999, Ser. No. 09/228,348, now U.S. Pat. No. 6,213,612, which is herein incorporated by reference in its entirety, a wire manifold or coupler has been designed that permits the wires to be terminated in the coupler before assembly of the mirror assembly, with the coupler configured so that it can be fed through the pivot member during the assembly of the mirror to substantially improve the efficiency and accuracy of the mirror assembly process. As the number of electrical components in the mirror assembly increase, however, demands on the size of the coupler similarly increase.

Consequently, there is a need for break-away exterior rearview mirror assembly that offers a simplified break-away mechanism that consumes less space than conventional break-away mechanisms while at the same time providing improved vibration characteristics and, further, providing a simplified assembly process.

SUMMARY OF THE INVENTION

Accordingly, the present invention provides an improved exterior rearview mirror assembly, especially suited for mounting on a vehicle. The exterior rearview mirror assembly includes a movable portion that is pivotally mounted to the vehicle by a fixed portion, such as a mounting bracket, and is adapted to break-away from a normal operating position (in which the movable portion is extended from the vehicle and provides a rearward filed of view to the occupant or occupants of the vehicle) to a folded position about the fixed portion closer to or adjacent the vehicle when the mirror assembly strikes or is struck by an object. The break-away function is provided by a resilient element, preferably a spring element, such as a spring, (and with a corresponding engagement element provided on the mirror assembly for cooperation with the engagement element provided on the resilient element) that incorporates at least one engagement element into the body of the resilient element, such as in a body of a spring, and, as a result, provides an engagement element (such as a detent or indent) that flexes and, therefore, does not induce a separating motion between the movable portion and the fixed portion when the movable portion is folded about the bracket. As a result, the bearing of contact the movable portion and the fixed portion may be varied from conventional break-away mirror designs to increase the dampening performance of the mirror.

According to one form of the invention, a break-away vehicle exterior rearview mirror system includes an exterior rearview mirror assembly. The exterior rearview mirror assembly includes a movable portion having a reflective element housed in the movable portion and a fixed portion adapted for mounting the movable portion to a vehicle. The exterior rearview mirror assembly further includes a pivot member, with the movable portion being pivotally mounted to the fixed portion by the pivot member for pivoting about a pivot axis for moving from a normal operating position to a break-away position. The fixed portion includes a first engagement element, and the movable portion includes a second engagement element. One of the movable portion and the fixed portion generates a resilient force, which urges the first and second engagement elements into releasable engagement with each other to thereby engage the movable portion with the fixed potion about the pivot axis. The second engagement element of the movable portion releases from engagement with the first engagement element of the fixed portion to permit the movable portion to pivot about the pivot axis when an external force having a sufficient magnitude is applied to the movable portion to overcome the resilient force. One of the engagement elements flexing when the external force is applied to the movable portion.

In one aspect, the movable portion includes the pivot member, with the movable portion and the pivot member pivoting about the pivot axis when the force is applied to the movable portion. In further aspects, the movable portion includes an actuator for adjusting the position of the reflective element in the movable portion and an actuator bracket which supports the actuator. In yet a further aspect, the actuator bracket includes the pivot member.

In another aspect, the resilient force is applied by a resilient member which includes one of the engagement elements. For example, the resilient member preferably comprises a spring and, more preferably, a plate spring. In further aspects, the resilient member is mounted to the pivot member and, preferably, coupled to the pivot member so that the resilient member rotates with or remains stationary with the pivot member. In yet further aspects, the resilient member includes at least two radially extending arms, with each of the arms including an engagement member.

In another form of the invention, a break-away vehicle exterior rearview mirror system includes an exterior rearview mirror assembly, which includes a movable portion and a fixed portion. The movable portion includes a reflective element, an actuator, and an actuator bracket, with the actuator providing adjustment of an orientation of the reflective element in the movable portion, and the actuator bracket supporting the actuator. The fixed portion is adapted to mount to a vehicle. One of the actuator bracket and fixed portion includes a pivot member, with movable portion being pivotally mounted to the fixed portion for pivoting about a pivot axis by the pivot member. A resilient member is mounted to the pivot member and releasably engages either the actuator bracket or the fixed portion, which engagement is released when an external force having sufficient magnitude to overcome the resilient force of the resilient member is applied to the movable portion whereby the movable portion pivots about the pivot axis to move between a normal operating position and a folded break-away position.

In one aspect, the actuator bracket includes the pivot member, with the movable portion and the pivot member pivoting about the pivot axis when the external force is applied.

In further aspects, the resilient member includes at least one of a detent or an indent, which releasably engages the fixed portion. In preferred form, the fixed portion includes an indent, with the resilient member including a detent, which releasably engages the indent of the fixed portion and disengages from the indent when the external force is applied to the movable portion.

In preferred form, the resilient member comprises a plate spring and, preferably, includes a central portion having a central opening and a plurality of radial portions extending outwardly from the central portion. Each of the radial portions includes a detent. In further aspects, the fixed portion includes an annular wall, with the annular wall having a plurality of indents which are releasably engaged by the detents of the resilient member to releasably engage the fixed portion. In yet further aspects, the resilient member includes an annular rim at the central opening, which seats the resilient member on the pivot member.

In yet another form of the invention, a break-away vehicle exterior rearview mirror system includes an exterior rearview mirror assembly. The exterior rearview mirror assembly includes a movable portion and a fixed portion. The movable portion includes a reflective element housed in the movable portion and a pivot member. The fixed portion is adapted for mounting the movable portion to a vehicle, with movable portion being pivotally mounted to the fixed portion by the pivot member for pivoting about a pivot axis. A resilient member is mounted to the pivot member and applies a resilient force to urge the movable portion into a releasable engagement with the fixed portion and releases the engagement when an external force having sufficient magnitude to overcome the resilient force of the resilient member is applied to the movable portion whereby the movable portion pivots about the pivot axis between a normal operating position and a folded break-away position.

In one aspect, the resilient member includes at least one engagement element for releasably engaging the fixed portion. In further aspects, the engagement element flexes when an external force is applied to the movable portion whereby the movable portion and the fixed portion maintain their relative spacing when the movable portion is pivoted about the pivot axis.

As will be understood, the exterior rearview mirror system of the present invention provides numerous advantages over prior known mirror assemblies. The rearview mirror system provides a break-away mechanism, which protects the mirror assembly from damage in the event that the mirror assembly is impacted during the use of the vehicle, with a break-away mechanism which consumes less space than conventional break-away mechanisms. With the reduced space, the height of the pivot member can be reduced thus increasing the size of the available pathway from the mounting bracket into the mirror assembly to ease wiring of the ever increasing number of electrical components within the mirror assembly. In addition, the exterior rearview mirror system exhibits increased dampening and, therefore, also exhibits improved vibration characteristics while also providing a consistent stable, break-away force over the life of the mirror assembly.

These and other objects, advantages, purposes, and features of the invention will become more apparent from the study of the following description taken in conjunction with the drawings.

BRIEF DESCRIPTION OF THE DRAWINGS

FIG. 1 is a plan view of right-hand side and left-hand side rearview mirror systems of the present invention installed on a vehicle;

FIG. 2 is an enlarged perspective view of the left-hand side rearview mirror system of FIG. 1;

FIG. 4 is an enlarged cross-section view taken along line IV—IV of FIG. 2 of one form of the break-away mechanism;

FIG. 4A is an end elevation taken from view IVA—IVA in FIG. 4;

FIG. 6A is a view similar to FIG. 4A of the resilient member of FIG. 6;

FIG. 9 is an enlarged cross-section view similar to FIG. 5 of a fourth embodiment of the break-away mechanism;

FIG. 10 is a plan view of the resilient member of the break-away mechanism of FIG. 9;

FIG. 11 is a bottom plan view of one resilient member arm of the resilient member of FIG. 10;

FIG. 12 is an enlarged cross-section taken along line XII—XII of FIG. 9;

FIG. 14 is a bottom perspective view of the movable portion of the mirror assembly of FIG. 13;

FIG. 15 is a top perspective view of the mounting bracket of the mirror system of FIG. 13;

FIG. 17 is a perspective view of another embodiment of the break-away mechanism of the present invention;

FIG. 18 is an exploded perspective view of the break-away mechanism of FIG. 17;

FIG. 19 is a cross-section view taken along line XIX—XIX of FIG. 17; and

FIG. 20 is a cross-section view taken along line XX—XX of FIG. 17.

DESCRIPTION OF THE PREFERRED EMBODIMENTS

Figure 3:
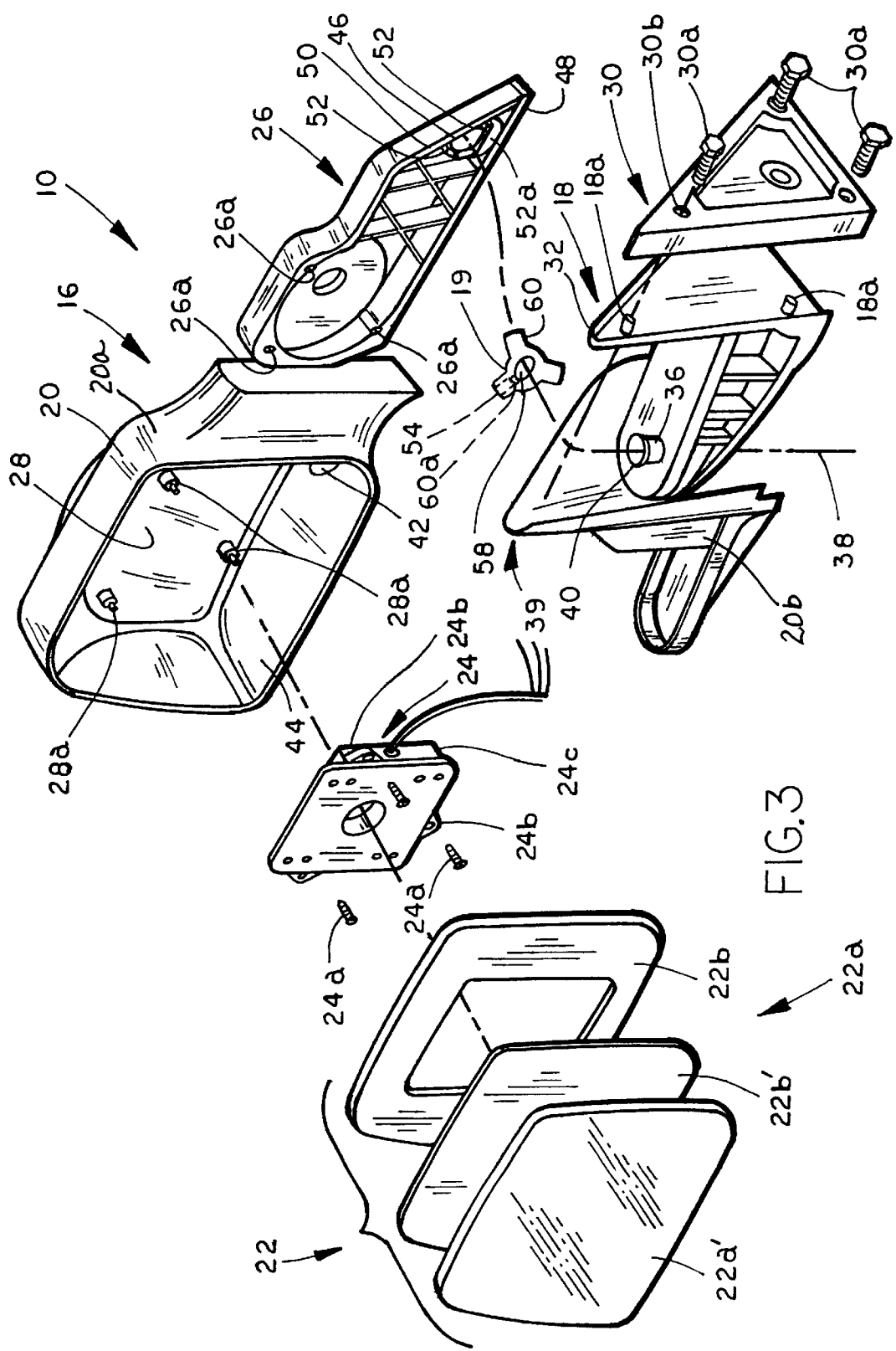
FIG. 3 is an exploded perspective view of the exterior rearview mirror system of FIG. 2.
Figure 5:
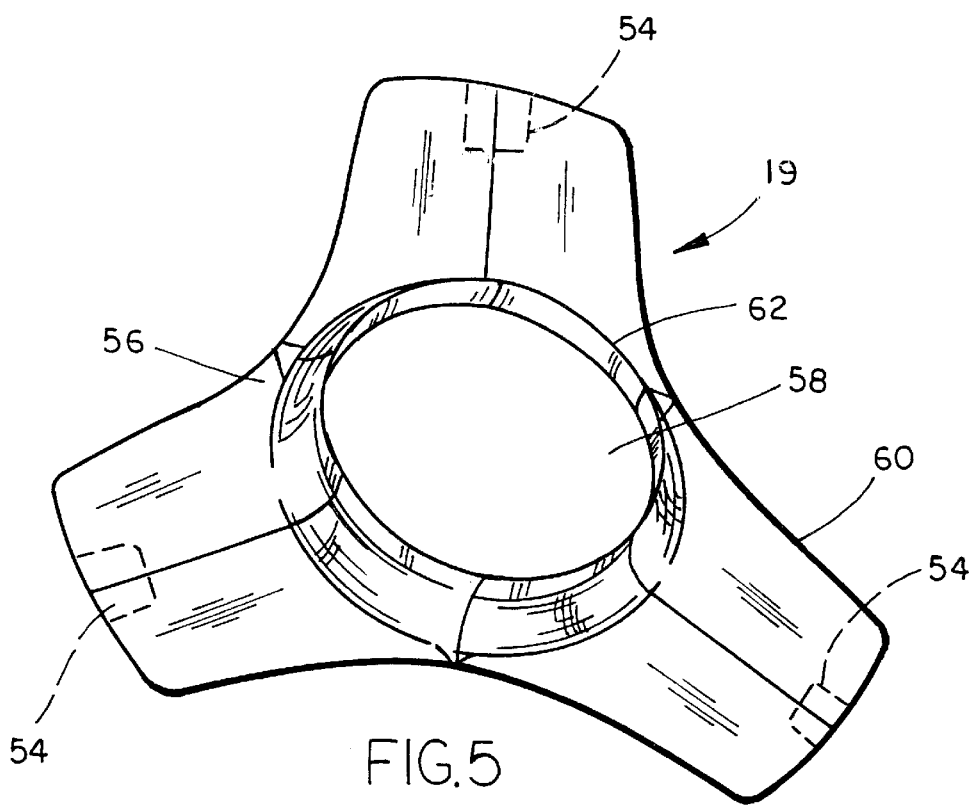
FIG. 5 is an enlarged plan view of the spring of the break-away mechanism of FIG. 4.

Referring to FIG. 1, left-hand side and right-hand side exterior rearview mirror systems 10 and 10' of the present invention are shown mounted to a panel 12 of vehicle 14. While reference hereinafter is made to the left-hand side mirror system 10, it should be understood that the components of the right-hand side mirror system are essentially the same, with some components necessarily having mirror image configurations. By way of reference to FIG. 2, rearview mirror system 10 includes a mirror assembly 16 with a movable portion 16a and a fixed portion 16b. Fixed portion 16b includes a mounting bracket 18, which mounts mirror system 10 to vehicle 14 (FIG. 1). Rearview mirror system 10 further includes a resilient member 19 (FIG. 3) which provides a break-away mechanism, as will be more fully described below, that occupies less space than conventionally known break-away mechanisms and, further, provides enhanced dampening characteristics.

Referring to FIG. 3, mirror assembly 16 includes a housing or mirror casing 20, which includes a movable portion 20a in which a reflective element assembly 22 is supported by an actuator 24 and a fixed portion 20b which houses bracket 18. Actuator 22 is mounted in housing 20 by an actuator bracket 26. Housing 20 is preferably a molded housing formed from a plastic material, and, more preferably, formed from a polypropylene or glass nylon filled material. For example, housing 20 may be formed from other suitable materials, such as a polyolefin, and painted or coated with a decorative finish, such as described in U.S. Pat. No. 6,150,014 (Attorney Docket DON01 P-760); and U.S. pending patent application entitled COATED POLYOLEFIN EXTERIOR VEHICLE PARTS AND METHOD FOR MAKING SAME, Ser. No. 09/489,322, filed Jan. 21, 2000 (Attorney Docket DON01 P-773), which are herein incorporated by reference in their entireties. In addition, housing 20 may incorporate wind noise reduction features, such as disclosed in U.S. patent application entitled OUTSIDE SIDEVIEW MIRROR ASSEMBLY WITH REDUCED WIND NOISE, Ser. No. 09/482,199, filed Jan. 12, 2000 (Attorney Docket DON01 P-791), now U.S. Pat. No. 6,419,300, which is herein incorporated by reference in its entirety. Similarly, actuator bracket 26 is preferably molded from a plastic material and, more preferably, from a polypropylene or a glass nylon filled material. Bracket 26 may also be formed from a reinforced polyolefin, such as described in U.S. Pat. No. 6,109,586, which is herein incorporated by reference in its entirety. Reflective element assembly 22 includes a reflective element 22a, which may be formed from a glass substrate 22a' and a reflective coating 22b' or may comprise an electrochromic reflective element, as is known in the art. Suitable electrochromic mirror elements include, for example, one of several types of electrochromic mirror elements, such as an element of the electrochemichromic type which is disclosed in U.S. Pat. No. 5,140,455, or the solid-state type such as disclosed in, for example, U.S. Pat. No. 4,712,879, U.S. Pat. No. 5,910,854, and U.S. patent application Ser. No. 08/238,521, filed May 5, 1994, by Varaprasad et al. now U.S. Pat. No. 5,668,663, all commonly assigned with the present application to Donnelly Corporation of Holland, Mich., the disclosures of which are herein incorporated by reference in their entireties. Other suitable electrochromic elements and/or mirror reflector elements are described in U.S. Pat. Nos. 5,151,816; 5,142,407; 6,210,008; and 6,196,688, and in copending U.S. patent applications entitled DIGITAL ELECTROCHROMIC MIRROR SYSTEM, Ser. No. 09/533,260, filed Mar. 20, 2000, (Attorney Docket No. DON01 P-808), now U.S. Pat. No. 6,305,807, the disclosures of which are incorporated by reference herein in their entireties. Alternatively, or in addition, reflective element assembly 22 may include a plano-reflective element, such as described in U.S. patent application entitled EXTERIOR MIRROR PLANO-AUXILIARY REFLECTIVE ELEMENT, Ser. No. 09/478,315, filed Jan. 6, 2000, the disclosure of which is incorporated by reference in its entirety.

Reflective element assembly 22 further includes a backing plate 22b, which is mounted to reflective element 22a by an adhesive and mounts reflective element 22a to actuator 24 by conventional means, including an adhesive, couplers, or fasteners or the like. In the illustrated embodiment, actuator 24 comprises an electric actuator; however, it can be appreciated that actuator 24 may comprise a manual actuator including, for example, a BODEN cable actuator. Examples of suitable actuators are described in U.S. Pat. No. 6,037,689 and copending application entitled HOUSING WITH INTEGRAL GASKET COMPONENTS FOR A REARVIEW MIRROR ACTUATOR ASSEMBLY, Ser. No. 09/520,868, filed Mar. 7, 2000 (Attorney Docket DON01 P-805), now U.S. Pat. No. 6,362,548, which are incorporated by reference in their entireties.

Actuator 24 is mounted to actuator bracket 26 by a plurality of fasteners 24a which extend through mounting ears 24b of actuator housing 24c and into corresponding threaded bosses 26a of actuator bracket 26. In the illustrated embodiment, actuator bracket 26 is mounted to a back wall 28 of housing or mirror casing 20 on a plurality of mounting bosses 28a. Optionally, fasteners 24a of actuator 24 may extend through threaded bosses 26a of bracket 26 and extend through to mounting bosses 28a to provide a simplified but rigid mounting arrangement. Alternately, bracket 26 may be heat staked onto bosses 28a. Alternatively, mirror assembly 16 may comprise an extendable mirror or adjustable mirror, such as described in U.S. Pat. Nos. 5,969,890; 6,239,928; 6,116,743; 6,139,159; 6,113,241, and pending U.S. patent applications entitled EXTENDABLE EXTERIOR REARVIEW MIRROR ASSEMBLY, Ser. No. 09/267,532, filed Mar. 12, 1999, now U.S. Pat. No. 6,325,518, which are incorporated herein by reference in their entireties.

Referring again to FIG. 3, mounting bracket 18 is mounted to vehicle 14 on a base 30. Base 30 is secured to the vehicle panel or body by a plurality of fasteners 30a which extend into corresponding threaded openings 30b provided in base 30 and into corresponding threaded bosses 18a of bracket 18. Mounting bracket 18 includes a mounting flange 32 and a base flange 34 which projects outwardly from mounting flange 32. Base flange 34 includes a pivot member, such as pivot member 36, through which extends a pivot axis 38. Preferably, housing 20 extend over mounting bracket 18 to form a fixed portion or cover 29, which optionally and preferably matches the styling of the movable portion of housing 20. As will be more fully described below, actuator bracket 26 pivotally mounts movable portion 16a on pivot member 36 to permit movable portion 16a to pivot about pivot axis 38 between its normal operating position (as shown in FIG. 1) in which the movable portion is extended from the vehicle and provides a rearward filed of view to the occupant or occupants of the vehicle and a folded, break-away position (shown in phantom in FIG. 1) in which the movable portion is moved in toward the vehicle.

As best seen in FIG. 4, pivot member 36 is a truncated sleeve and includes a bayonet type flange 40 for securing resilient member 19 on member 36. With a shortened pivot member, the pathway or passageway from the mounting bracket to the mirror assembly is shortened which provides improved maneuvering for wiring or the like and, therefore, permits electrical harnesses or couplers of increasing size to be passed through the pivot member to couple the wiring to the various electrical components within the mirror assembly. Electrical components that can be incorporated into mirror system 10 include: Antennas, such as GPS, garage door opener, or cellular phone antennas or the like; or cameras, such as part of a rear vision system described in U.S. Pat. No. 6,201,642, and pending U.S. patent application Ser. No. 09/433,467, (Attorney Docket No. P-783), filed Nov. 4, 1999, entitled VEHICLE INTERIOR MIRROR ASSEMBLY to Patrick Heslin and Niall R. Lynam, now U.S. Pat. No. 6,326,613, all of which are incorporated by reference in their entireties herein. Also system 10 may incorporate signal lights or security lights, such as disclosed in U.S. Pat. Nos. 6,099,155; 6,074,077, 6,176,602; and 6,149,287 and pending U.S. patent application entitled VEHICLE EXTERIOR MIRROR SYSTEM WITH SIGNAL LIGHT, Ser. No. 09/335,010, filed Jun. 17, 1999, now U.S. Pat. No. 6,276,821, which are herein incorporated by reference in their entireties, or may comprise memory mirrors as part of a memory mirror system, such as disclosed in U.S. Pat. No. 6,093,976, and pending U.S. patent application entitled MEMORY MIRROR SYSTEM FOR VEHICLE, Ser. No. 09/572,008, filed May 16, 2000 (Attorney Docket DON01 P-804), or may include a transmitter or receiver as part of a remote transaction system, such as disclosed in U.S. Pat. No. 6,158,655, the disclosures of which are incorporated by reference in their entireties.

In addition, flange 40 provides a locating function to ease assembly of resilient member 19 onto pivot member 36. Prior to resilient member 19 being mounted on pivot member 36, pivot member 36 is extended through an opening 42 provided in bottom wall 44 of casing 20 and through a corresponding opening 46 provided in bottom web wall 48 of actuator bracket 26. Web wall 48 supports or includes at least one and, more preferably, a plurality of engagement structures or elements 50, which are releasably engaged by resilient member 19. In preferred form, each engagement element 50 includes at least one camming surface and, more preferably, comprises a groove or indent 52, which are optionally formed on an annular wall 52a (FIG. 4). Indents 52 are engaged by a corresponding plurality of engagement elements, preferably each having at least one camming surface, and, more preferably, comprising detents 54. Detents 54 are preferably provided on resilient member 19. In the illustrated embodiment, bracket 26 includes three indents 52 which correspond with the three detents 54 (FIG. 6) provided on resilient member 19.

Figure 6:
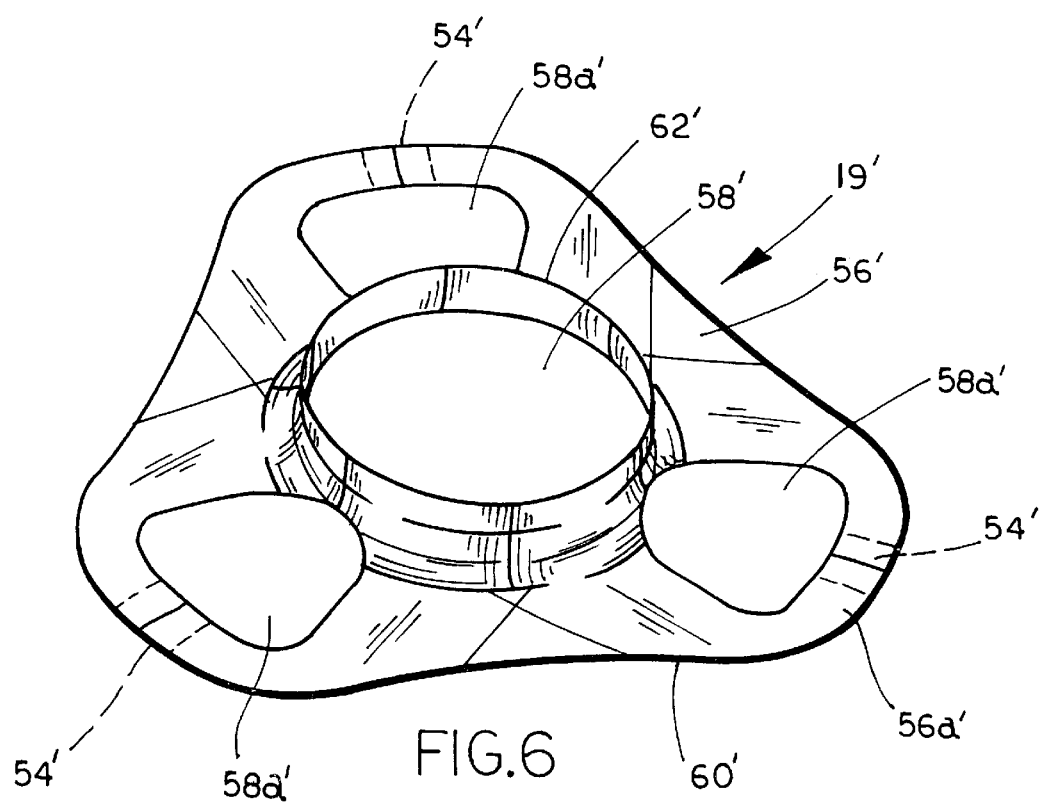
FIG. 6 is an enlarged plan view of a second embodiment of the resilient member of the present invention.

As best seen in FIGS. 4 and 6, resilient member 19 comprises a plate spring having a central body portion 56 with a central opening 58 and a plurality of radially extending arms 60 which extend outwardly from central body portion 56 to provide spring arms. When mounted on pivot member 36, arms 60 are urged upwardly (as viewed in FIG. 4) by engagement with indents 52, which upward force develops a resilient force or spring-like force in resilient member 19. In the illustrated embodiment, detents 54 include V-shaped cross-sections, and indents 52 comprise generally V-shaped grooves which are at least generally commensurate in size and shape with the corresponding detents 54. In this manner, when detents 54 are aligned with indents 52, detents 54 will seat in indents 52 and, further, when an external force is applied to mirror assembly 16 offset from pivot axis 38, the sloped sides of detents 54 create a camming action and urge detents 54 to disengage from indents 52. Given the configuration of resilient member 19, detents 54 flex upward (as viewed in FIG. 4) to disengage from indents 52. Thus the relative spacing between the mounting bracket and the mirror assembly remains generally constant even when mirror assembly 16 is pivoted about pivot axis 38. In other words, the rotation of the mirror assembly on the mounting bracket about pivot axis 38 does not result in relative movement between the mirror assembly and the mounting bracket unlike prior art assemblies. In addition, as seen in FIG. 4, the contact between actuator bracket 26 and mounting bracket 18 is increased over conventional break-away mirror assemblies and extends radially outward from and beyond the detents and indents and provides an increased resistance to bending such that the mirror assembly exhibits improved dampening over conventional designs.

Resilient member 19 is preferably rotatably coupled to pivot member 36, for example, by a key 59. Key 59 projects outwardly from pivot member 36 and engages a corresponding slot 60a (FIG. 3) provided on central portion 56 of resilient member 19. In this manner, resilient member 19 remains stationary with pivot member 36. As can be appreciated from the foregoing description, when actuator bracket 26 and mirror assembly 16 are pivoted about pivot member 36 to their normal operation position (FIGS. 1 and 4), detents 54 engage corresponding indents 52 and releasably couple mirror assembly 16 to mounting bracket 18. However, when an external force is applied to mirror assembly 16 which has a sufficient magnitude to overcome the resilient force of resilient member 19, detents 54 disengage from indents 52.

Again referring to FIG. 4, resilient member 19 preferably includes a raised annular flange or rim 62 which extends around opening 58. Rim 62 seats resilient member 19 on flange 40 and, further, increases the local stiffness of resilient member 19 about opening 58. Thus, when resilient member 19 is urged onto pivot member 36, flange 40 and rim 62 together provide a snap-on assembly. Furthermore, rim 62 engages the underside 40a of flange so that when detents 54 are positioned in indents 52, and as noted above, arms 60 form spring arms. It can be appreciated that the size of rim 62, the length of arms 60, and the thickness of the spring plate contribute to the resilient force achieved by resilient member 19. Resilient member 19 is preferably formed from a steel, such as spring steel and, more preferably, tempered spring steel, and has thicknesses in the range of about 0.2 to 1.7 mm, more preferably, in a range of about 0.3 to 1.5 mm and, most preferably, in a range of about 0.5 mm to 0.8 mm. In this manner, resilient member 19 provides not only the resilient force required to urge the mirror assembly into engagement with the bracket, but further provides the detent mechanism. In addition, while indents 52 are illustrated in a radially extending pattern, indents 52 may be formed in a spaced linear relationship, such as described in U.S. Pat. No. 5,949,591, which is herein incorporated by reference in its entirety. As would be appreciated by those skilled in the art, the present invention provides a resilient member and detent break-away mechanism which reduces the required space for the break-away mechanism and, therefore, increases the available space in the mirror assembly providing increased flexibility in the styling of the mirror assembly. In addition, the present invention reduces the number of components while achieving the same function as conventional break-away mechanisms. As a result, the present invention provides a break-away assembly which also reduces the cost of the mirror assembly.

Referring to FIG. 6, a second embodiment of resilient member 19' is illustrated. Resilient member 19' includes a central body 56' with a central opening 58'. Extending around central opening 58' is a raised rim or flange 62' which increases the stiffness of central portion 56' of resilient member 19', similar to rim 62. Resilient member 19' further includes a plurality of openings 58a' which are spaced radially outward from central opening 58' which form a corresponding plurality of relatively flexible flanges 56a' on which detents 54' are provided. In this manner, resilient member 19' has an overall increased stiffness over resilient member 19 but retains its resilient or spring-like characteristics and, further, retains the relative flexibility of detents 54'. Therefore, when resilient member 19' urges detents 54' to engage a corresponding plurality of indents provided of the actuator bracket, detents 54' will releasably engage the corresponding indents and, yet, flex to disengage from the corresponding indents when a sufficient force is applied to the mirror assembly to overcome the resilient force of resilient member 19'. For example, resilient member 19' may be more suitable for larger mirror assembly. In addition, detents 54' may have V-shaped cross-section, similar to detent 54, or may have a rectangular shaped cross-section, such as illustrated in FIG. 6A. In the case of the rectangular cross-sectioned detent, the corresponding indent preferably includes at least slightly sloping sides 52' to provide camming surfaces to urge detents 54' to lift out of indents 52 when a sufficient force is applied to the mirror assembly.

In another embodiment, that the break-away mechanism is inverted. For example, referring to FIG. 6, actuator bracket 26" may include pivot member 36" which extends into opening 46" provided in base flange 34" of bracket 18". Resilient member 19" includes a plurality of detents 54" for engaging a corresponding plurality of indents 52" provided on web wall 34a" of base flange 34" of bracket 18". Preferably, web wall 34a" is reinforced by webbing 34b" and 34c". As described in reference to the previous embodiment, resilient member 19" is preferably coupled to pivot member 36" so that resilient member 19" pivots with pivot member 36" and mounting bracket 26" when mounting bracket 26" rotates around pivot axis 38". It should be understood, that resilient member 19" may include a corresponding plurality of indents while the actuator bracket or mounting bracket may include a corresponding plurality of detents. Furthermore, the indents or detents provided on the actuator bracket may be provided on an annular wall such as illustrated in reference to the break-away mechanism illustrated in FIG. 4.

Referring to FIGS. 9–12, another embodiment of the break-away mechanism of the present invention includes a resilient member 119 with a generally planar body 156, a central opening 158, and a plurality of outwardly extending arms 160. Similar to the first embodiment, resilient member 119 is mounted on pivot member 136, which is provided on mounting bracket 118, with pivot member 136 extending through opening 158 of resilient member 119. To retain resilient member 119 on pivot member 136, pivot member 136 includes a mounting or bayonet type flange 140 similar to flange 40 discussed in reference to the first embodiment. In this manner, the perimeter of opening 158 bears against under side 140a of flange 140, with arms 160 bearing against bracket 126 to create the resilient force in 115 resilient member 119. In the illustrated embodiment, flange 140 includes discrete flange portions 140b and further includes a key 140c which engages a corresponding key way in resilient member 119 to thereby couple resilient member 119 to pivot busing 136. Arms 160 each include a detent 154 for engaging a corresponding indent 152 provided on actuator bracket 126. As best seen in FIGS. 11 and 12, each detent 154 includes a trapezoidal-shaped cross-section, with indent 152 comprising a trapezoidal-shaped groove. Indents 152 are preferably formed on an annular wall 152a provided on web wall 148 of bracket 126. It should be understood that indents 152 may optionally be provided on discrete annular wall segments, with the segments being preferably sized to support spring arms 160 over their full range of motion. Alternately, indents 152 may be recessed in web wall 148. Pivot member 136 extends through an opening 146 provided in web wall 148 of actuator bracket 126, which is preferably reinforced by an annular flange 144a to enhance the dampening characteristics of the mirror assembly.

In the illustrated embodiment, web wall 144 of actuator bracket 126 includes a plurality of projecting contacts or raised portions 144b on its lower surface (as viewed in FIG. 9) which provide bearing contact between actuator bracket 126 and mounting bracket 118. Preferably, actuator bracket 126 includes at least three raised portions 144b which maintain bearing contact with mounting bracket 118 when the mirror assembly is pivoted about pivot axis 138. It should be understood that web wall 144 of actuator bracket 126 may alternately include a planar bearing surface similar to the first embodiment.

Figure 13:
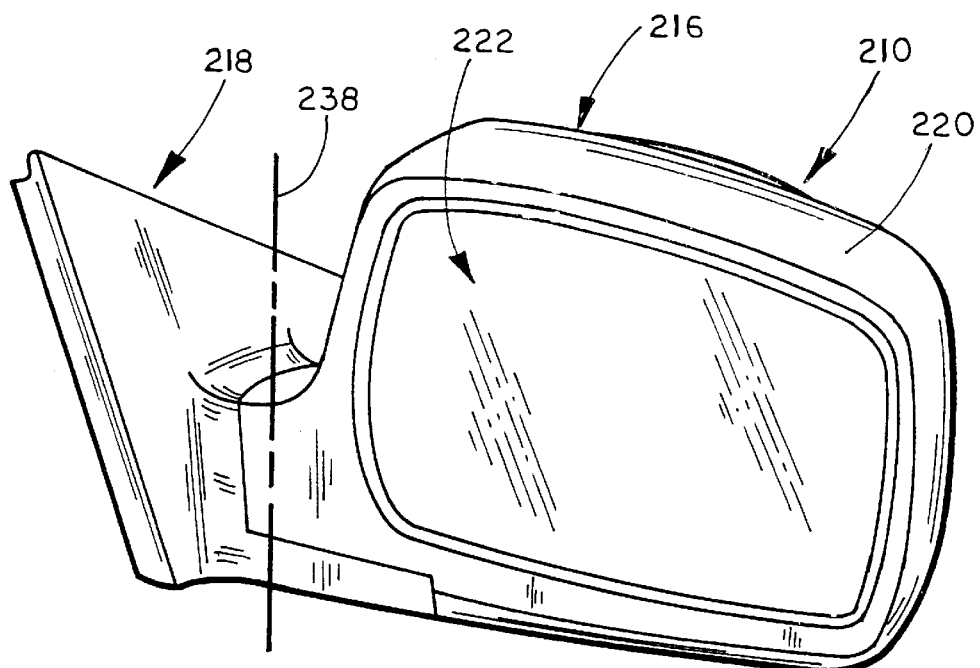
FIG. 13 is a perspective view of another embodiment of the exterior rearview mirror system of the present invention.

The present invention is equally applicable to a mirror assembly in which the reflective element and/or actuator are mounted directly to the housing or casing wall. Referring to FIG. 13, the numeral 210 generally designates another embodiment of the exterior rearview mirror system of the present invention. Exterior rearview mirror system 210 includes an exterior rearview mirror assembly 216, with a movable portion 216a and a fixed portion 216b, which mounts mirror system 210 to a vehicle by bracket 218. Mirror assembly 216 includes a housing or mirror casing 220 and a reflective element assembly 222 which is supported in a movable portion 216a of assembly 216, for example by an actuator, including an electrical actuator or manual actuator, such as a BODEN cable actuator, or may be fixedly mounted in housing 220.

The movable portion 216a of mirror assembly 216 is pivotally mounted on mounting bracket 218 and is adapted to pivot about a pivot axis 238 to move form its normal operating position, illustrated in FIG. 13, to a break-away position in which the mirror assembly 216 is folded toward the vehicle. As previously noted, break-away mechanisms are provided to protect the mirror assembly 216 from damage in the event that the mirror assembly makes an impact with a rigid object.

Referring to FIG. 14, mirror housing 220 includes a mounting portion 220a. Mounting portion 220a includes a recessed wall 220b which is spaced from bottom wall 220c of housing 220 so that when movable portion 216a is mounted on bracket 218, mirror assembly 216 and mounting bracket 218 together form an aerodynamic exterior rearview mirror system in which the outer surfaces of the mounting bracket 218 and outer surfaces of the mirror assembly 216 provide a substantially continuous exterior surface. Projecting downwardly from recessed wall 220b is a pivot member 236, which pivotally mounts mirror assembly 216 onto bracket 218.

As best seen in FIG. 15, bracket 218 includes a mounting flange 232 and an L-shaped mounting base 234 which projects from mounting flange 232. Mounting base 234 includes a first leg portion 234a which is preferably integrally formed with mounting flange 232 and a generally horizontal and outwardly projecting leg 234b, onto which mirror assembly 216 is mounted by pivot member 236. Extending through web wall 234b' of leg 234b is an opening 238 through which pivot member 236 extends to pivotally couple mirror assembly 216 to bracket 218.

Figure 7:
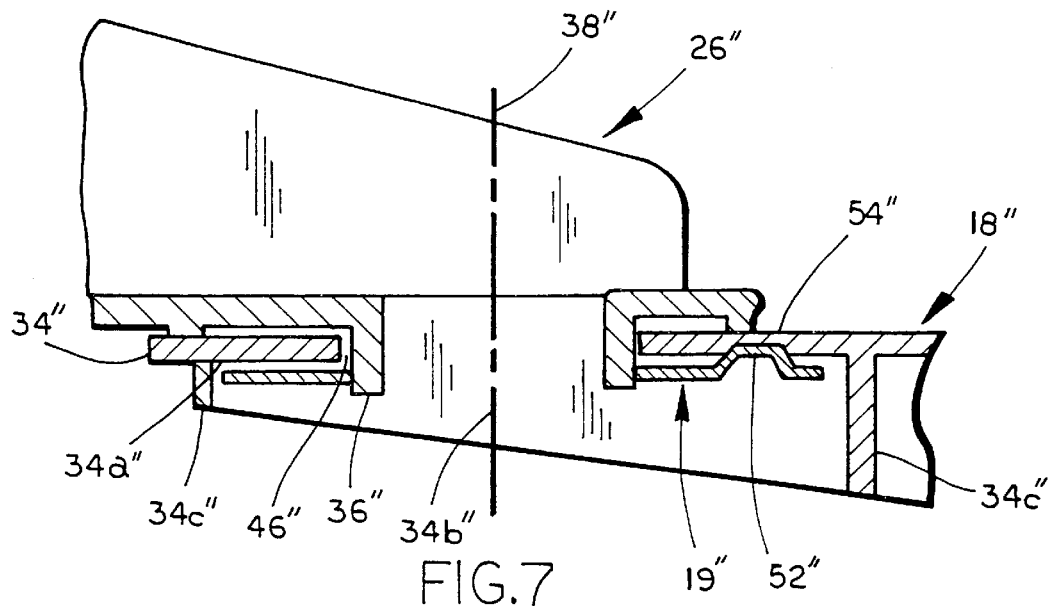
FIG. 7 is a cross-section similar to FIG. 4 of another embodiment of the break-away mechanism of the present invention.
Figure 8:
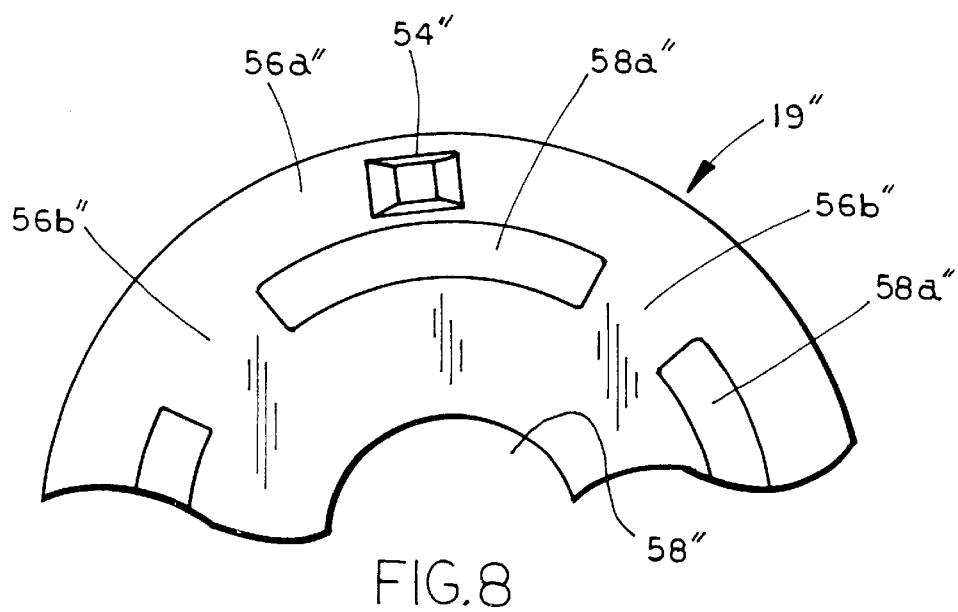
FIG. 8 is an enlarged plan view of the resilient member of the break-away mechanism of FIG. 7.
Figure 16:
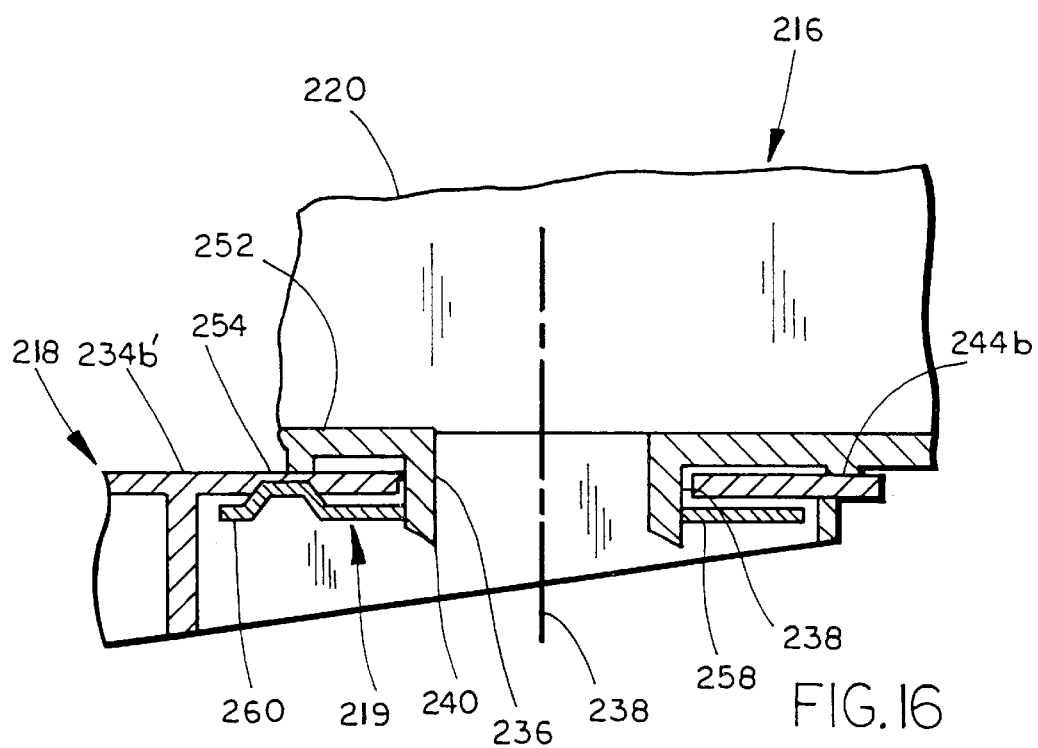
FIG. 16 is a cross-section taken along line XVI—XVI of FIG. 13.

As best seen in FIG. 16, movable portion 216a is pivotally coupled to mounting bracket 218 by pivot member 236 and by a resilient member 219. Resilient member 219 is of similar construction to resilient member 19" and includes a central opening 258 through which pivot member 236 extends. Pivot member 236 preferably includes a bayonet-type retention flange 240, which retains resilient member 219 on pivot member 236. In addition, resilient member 219 includes a plurality of spring arms 260 which respectively include an engagement element, such as a detent 254, for engaging a corresponding engagement element, such as an indent, provided on web wall 234b' of mounting base 234. Similar to the previous embodiments, recessed wall 220b includes a plurality of projecting portions or projecting ribs 244b, which provide bearing contact between mirror assembly 216 and bracket 218. Thus, when movable portion 216a pivots about pivot axis 238 to its normal operating position, detents 254 engage corresponding indents 252 to releasably couple movable portion 216a to fixed portion 216b similar to the previous embodiments. When a force is applied to movable portion 216a which has a sufficient magnitude to overcome the resilient force of resilient member 219, the angled surfaces of detents 254 and indents 252 deflect detents 254 upwardly (as seen in FIG. 7) to disengage detents 254 from indents 252 and movable portion 216a pivots about pivot axis 238 to its folded, break-away position.

Referring to FIGS. 17–20, the numeral 310 generally designates another embodiment of a break-away mechanism of the present invention. Referring to FIG. 17, break-away mechanism 310 includes a first portion 312 and a second portion 314 which are pivotally interconnected by way of a central pivot member 316, which projects from first portion 312 and extends through an opening 318 (FIG. 18) provided in second member 314. First member 312 may comprise a movable member, with second member comprising a fixed member. Alternately, first member 312 may comprise a fixed member, with second member 314 comprising a movable member. For example, first member 312 may comprise a fixed portion of a mirror assembly, such as the mounting portion such as designated by the numeral 18 in the first embodiment, while second portion 314 may comprise the movable portion of a mirror assembly, such as the mirror housing (such as housing 16) or the actuator bracket (such as bracket 26), which may be included in the mirror housing. Material forming members 312 or 314 may be plastic, aluminum, or zinc or the like.

Mounted to pivot member 316 is a resilient member 320, which releasably couples second member 314 with first member 312 about a pivot axis 360, similar to the previous embodiments. Resilient member 320 is mounted on pivot member 316 and rotatably coupled to pivot member 316 by one or more inwardly projecting keys 322 which engage corresponding notches or recesses 324 provided in pivot member 316. In this manner, resilient member 320 is fixed to pivot member 316 in the sense that it remains stationary relative to pivot member about axis 360. As will be more fully described below, pivot member 316 is adapted to bias resilient member 320 whereby resilient member 320 engages and further applies a compressive force to second member 314 to thereby urge the facing surfaces 314a and 312a of second member 314 and first member 312, respectively, together.

Referring to FIG. 18, second member 314 includes a base 325 with a raised wall or landing 328 at its perimeter 326. Landing 328 includes a plurality of grooves or notches 330 provided therein to cooperate with resilient member 320. Resilient member 320 includes a corresponding plurality of projecting members 332, such as detents, which engage the corresponding recesses 330 provided in second member 314. With resilient member 320 coupled to pivot member, detents 332, therefore, rotatably couple first member 312 to second member 314 when detents 332 are lodged in recesses 330.

In the illustrated embodiment, pivot member 316 comprises a cylindrical member 334 which extends through a central opening 320a of resilient member 320. Cylindrical member 334 includes an enlarged retaining lip 336 (FIG. 20) that retains resilient member 320 on pivot member 316. In addition, in the illustrated embodiment, notches 324 comprise elongated slots or recesses 338 which permit portions of cylindrical member 334 to flex and form flexible or spring-like wall segments or fingers 340. Alternately, pivot member 316 may include separate notches for keys 322 that are circumferentially spaced from elongated slots 338. When resilient member 320 is mounted on pivot member 316, resilient member 320 will compress resilient portions 340 so that they flex inwardly. In addition, resilient member 320 includes an upwardly projecting lip or rim 342 which provides local stiffness to resilient member 320 and provides a bearing surface for retaining rim 336. Once resilient member 320 is mounted on pivot member 316, and rim 342 is moved passed enlarged lip 336, flexible legs 340 return to their uncompressed position whereby lip 336 rests on top of lip 342 and, further, compresses resilient member 320, which will be more fully described below. In effect, lip 336 forms a bayonet-type connection between pivot member 316 and resilient member 320.

Referring to FIG. 20, raised annular portion 328 includes an angled upper surface 328a, which provides a bearing surface for resilient member 320. Resilient member 320 comprises a plate spring which has a generally triangular-shaped configuration with projecting legs or arms 350. Located at the distal end portion of each arm is a detent 332. Referring again to FIG. 17, detents 332 engage recesses 330 to thereby releasably couple second member 314 to first member 312. Furthermore, since resilient member 320 is biased toward second member 314, resilient member 320 will releasably fix the relative position of second member 314 relative to the first member 312 when detents 332 are positioned in recesses 330. Furthermore, this engagement will not be released until a torque or rotational force is applied to either member 312 or 314 which overcomes the resilient force applied by resilient member 320 to second member 314. The spring force of resilient member 320 is further enhanced by the angle of the surface 328a of perimeter portion 328.

As best seen in FIG. 20, when resilient member 320 is mounted on pivot member 316, resilient member 320 deflects and bows to create the spring force in resilient member 320. By varying the height of the peripheral portion 328, the spring force in resilient member 320 may be adjusted. Alternately or in addition, the length of arms 350 may be varied to increase or decrease the spring force provided by resilient member 320. In addition, the thickness of the plate 362 forming the plate spring may be varied along with the material. Preferably, the material forming the plate spring comprises a spring steel.

Referring to FIGS. 17 and 19, notches 330 are generally wedge-shaped with the sides 330a forming the notch being generally aligned along radial axes extending from the center 318a of opening 318. Therefore, sides 330a are generally angled with respect to each other. However, sides 330a are generally orthogonal to the planar surface 314a of first member 314. As a result, detents 332 form a line bearing contact 364 with sides 330a of notch 330, which produces a camming effect so that when a sufficient force is applied to one of the first or second members 312, or 314, detents 322 will be urged to lift out of notches 330 and second member 314 will rotate about axis 360. When a counteracting rotational force is applied to either of the members (312 or 314) about pivot axis 360, notches 330 will again align with detents 332 to thereby recouple the members together.

From the foregoing, it can be appreciated, that the present designs for the break-away mechanisms permit the relative pivotal movement of the members (312, 314) without the members separating. In other words, the movable portion pivots about the fixed portion while maintaining their relative spacing along the pivot axis generally constant. Instead, the spring flexes. Therefore, when the members are moved to their break-away position members 312 and 314 will not displace along pivot axis 316. As a result, break-away mechanism 310, as well as the previously described break-away mechanisms, provides a more compact arrangement; thus, freeing up valuable space in the mirror assembly, which can be used for storing other components or provides for more freedom with the styling of the assembly. Moreover, with the present designs, the break-away mechanisms produce less noise than conventional break-away mechanisms. Since there is no relative displacement between the fixed portion and the movable portion when the break-away mechanism is actuated, there is no dynamic impact from the two moving parts. The relative displacement exhibited in conventional break-away mechanisms creates an unexpected and undesirable amount of noise due to the dynamic impact of the mirror housing, for example, hitting the mounting portion when it is shifted between its non-break-away position and its break-away position.

Although illustrated as a cylindrical pivot member, the pivot members of the present invention may comprise triangular cross-sectioned pivot members, square cross-sectioned pivot members, or multifaceted cross-sectioned pivot members, in which case the resilient member need not be keyed to the pivot member. Furthermore, it should be understood, that similar to resilient member 19 described in reference to the previous embodiment, resilient member 320 may comprises a solid plate without openings 370. Moreover, the number of arms, notches, elongated slots, and keys may be increased or decreased.

It can be appreciated from the foregoing that a break-away exterior mirror system is provided which includes a movable portion, such as the movable portion of the mirror assemblies described and illustrated herein, and a fixed portion, such as the fixed portions disclosed and illustrated herein, with the movable portion pivotally mounted to the fixed portion by a pivot member, such as the truncated collars disclosed and illustrated herein. Each of the movable portion and the fixed portion includes at least one engagement element, such as the detents and indents described and illustrated herein, that cooperate under the influence of a resilient force to releasably engage the movable portion with the fixed portion so that the movable portion can be moved between a normal operating position and a folded position. Preferably, the engagement element flexes when the movable portion is pivoted about the fixed portion when an external force, which has a sufficient magnitude to overcome the resilient force, is applied to the movable portion without inducing any separating movement between the movable portion and the fixed portion. The resilient member of the present invention preferably comprises a plate resilient member (such as a metallic or a polymeric spring plate), and most preferably a plate resilient member that includes a bowed portion adapted to enhance the resilient force generated by the resilient member.

While several forms of the invention have been shown and described, other forms will now be apparent to those skilled in the art. For example, as previously noted, the mirror assemblies may comprise extendable or adjustable mirror assemblies (such as trailer-tow mirrors, and preferably, electrically extendable trailer-tow mirrors) and optionally may include fixed reflective elements. In addition, the fixed portion of the system may be incorporated into or form a part of a modular door, such as disclosed in U.S. provisional applications entitled EXTERIOR MIRROR ASSEMBLY FOR VEHICULAR MODULAR DOOR, Ser. No. 60/159,661, filed Oct. 15, 1999; and CUP ASSEMBLY FOR VEHICULAR MODULAR DOOR, Ser. No. 60/215,324, filed Jun. 30, 2000 (Attorney Docket DON01 P-827), which are incorporated herein by reference in their entireties.

Thus, and as described above, this present invention comprises a significant improvement over prior-art exterior mirror assembly pivot mechanisms. The unique pivot mechanism of the present invention enables manufacture of a more compact exterior mirror assembly. The break-away mechanism of the present invention operates with less noise than conventional known mechanisms. Also, as indicated above, the resilient member of the present invention preferably moves with one of either the fixed portion or the movable portion of the exterior mirror assembly when the assembly is impacted (such as in an accident or when hitting an obstruction), and with the break-away action being achieved by the overcoming of a spring-loaded engagement of the resilient member to the other of either the fixed portion or the movable portion of the exterior mirror assembly. The spring-loaded engagement is preferably directed in a direction (and generates an engagement force in a direction) parallel to the pivot axis about which the movable portion (that houses the exterior mirror reflective element) of the exterior mirror assembly swivels or pivots about the fixed portion of the exterior mirror assembly when the exterior mirror assembly of the present invention is mounted to a driver side or a passenger side of a vehicle. The one of either the fixed portion or the movable portion of the exterior mirror assembly of the present invention preferably includes a pivot member (such as a pivot post or the like) that passes through an opening in the other of either the fixed portion or the movable portion of the exterior mirror assembly, and with the resilient member also having an opening that the pivot member passes through, and adapted so as to generate a clamping force or resilient force holding the one to the other portion of the exterior mirror assembly, and with said clamping force sufficient to hold the portions together during normal use of the exterior mirror assembly on the vehicle (such as when normally driving on a highway), but with this clamping force or resilient force being of a magnitude that is overcome should the movable portion be impacted and should a break-away movement be desired or required due to application of an external force such as might occur should the movable portion of the exterior mirror strike an object such as a person or road obstacle. The present invention allows break-away movement of the movable portion of the exterior mirror assembly either in a direction towards the front of the vehicle (i,e., in the direction the vehicle is traveling when driving down a highway) to which the exterior mirror is attached or in a direction towards the rear of the vehicle (i,e., in the direction opposite to the direction the vehicle is traveling in when driving down a highway) to which the exterior mirror is attached.

Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which we claim exclusion property or privilege are defined as:

1. A break-away vehicle exterior rearview mirror system suitable for use on a vehicle, said system comprising:

an exterior rearview mirror assembly including a movable portion having a reflective element housed in said movable portion, said exterior rearview mirror assembly further including a fixed portion adapted for mounting said movable portion to a vehicle;

said movable portion being pivotally mounted to said fixed portion about a pivot axis for pivoting from a normal operating position to a break-away position closer to the side of the vehicle, said fixed portion including a first engagement element, said movable portion including a second engagement element, at least one of said movable portion and said fixed portion generating a resilient force, said first and second engagement elements being urged into releasable engagement with each other by said resilient force to thereby engage said movable portion with said fixed portion, said second engagement element of said movable portion releasing from said first engagement element of said fixed portion to permit said movable portion to pivot about said pivot axis when an external force having a sufficient magnitude is applied to said movable portion to overcome said resilient force, and at least one of said first and second engagement elements flexing when said external force is applied to said movable portion; and a resilient member, said resilient force being provided by said resilient member, said resilient member comprising a plate spring including at least two radially extending arms, each of said arms including one of said first and second engagement elements.

2. The break-away vehicle exterior rearview mirror system according to claim 1, wherein said exterior rearview mirror assembly including a pivot member, said movable portion being pivotally mounted to said fixed portion by said pivot member.

3. The break-away vehicle exterior rearview mirror system according to claim 2, wherein said movable portion includes said pivot member, said movable portion and said pivot member pivoting about said pivot axis when said external force is applied.

4. The break-away vehicle exterior rearview mirror system according to claim 2, wherein said movable portion includes an actuator for adjusting the position of said reflective element.

5. The break-away vehicle exterior rearview mirror system according to claim 4, wherein said movable portion includes an actuator bracket supporting said actuator.

6. The break-away vehicle exterior rearview mirror system according to claim 5, wherein actuator bracket includes said pivot member.

7. The break-away vehicle exterior rearview mirror system according to claim 1, wherein said exterior rearview mirror system includes a pivot member, said movable portion pivotally mounted to said fixed portion by said pivot member, and said resilient member being mounted to said pivot member.

8. The break-away vehicle exterior rearview mirror system according to claim 7, wherein said resilient member is coupled to said pivot member.

9. The break-away vehicle exterior rearview mirror system according to claim 8, wherein said movable portion includes said pivot member whereby said resilient member and said pivot member pivot with said movable portion when said movable portion is pivoted about said pivot axis.

10. The break-away vehicle exterior rearview mirror system according to claim 8, wherein said fixed portion includes said pivot member whereby said resilient member and said pivot member remain stationary with said fixed portion when said movable portion is pivoted about said pivot axis.

11. The break-away vehicle exterior rearview mirror system according to claim 7, wherein said resilient member includes a central opening, said pivot member extending though said central opening.

12. The break-away vehicle exterior rearview mirror system according to claim 11, wherein said resilient member includes an annular rim at said central opening, said rim seating said resilient member on said pivot member.

13. The break-away vehicle exterior rearview mirror system according to claim 11, wherein said pivot member biases said resilient member to generate said resilient force.

14. The break-away vehicle exterior rearview mirror system according to claim 13, wherein said pivot member and said resilient member have a bayonet-type connection.

15. The break-away vehicle exterior rearview mirror system according to claim 1, wherein at least one of said first and second engagement elements comprises a detent.

16. The break-away vehicle exterior rearview mirror system according to claim 15, wherein said detent includes at least one camming surface.

17. The break-away vehicle exterior rearview mirror system according to claim 16, wherein said detent includes a V-shaped cross-section.

18. The break-away vehicle exterior rearview mirror system according to claim 16, wherein said detent includes a trapezoidal-shaped cross-section.

19. The break-away vehicle exterior rearview mirror system according to claim 15, wherein said detent includes a generally rectangular cross-section.

20. The break-away vehicle exterior rearview mirror system according to claim 1, wherein at least one of said first and second engagement elements comprises an indent.

21. The break-away vehicle exterior rearview mirror system according to claim 20, wherein said indent includes at least one camming surface.

22. The break-away vehicle exterior rearview mirror system according to claim 20, wherein said indent includes one chosen from a V-shaped cross-section, a trapezoidal-shaped cross-section, and a rectangular cross-section.

23. The break-away vehicle exterior rearview mirror system according to claim 1, wherein said fixed portion includes a plurality of said first engagement element, and said movable portion including a plurality of said second engagement element.

24. The break-away vehicle exterior rearview mirror system according to claim 23, wherein each of said plurality of first engagement elements is selected from the group consisting of a detent and an indent.

25. The break-away vehicle exterior rearview mirror system according to claim 24, wherein each of said first engagement elements comprises a detent.

26. The break-away vehicle exterior rearview mirror system according to claim 1, wherein at least one of first and second engagement elements comprises a metal element.

27. The break-away vehicle exterior rearview mirror system according to claim 1, wherein said movable portion and said fixed portion maintain their relative spacing along said pivot axis when said movable portion is pivoted about said fixed portion.

28. A break-away vehicle exterior rearview mirror system suitable for use on a vehicle, said system comprising:

an exterior rearview mirror assembly including a movable portion, said movable portion including a reflective element, an actuator, and an actuator bracket;

said actuator providing adjustment of an orientation of said reflective element in said movable portion, and said actuator bracket supporting said actuator;

said exterior rearview mirror assembly further including a fixed portion adapted to mount to a vehicle;

said movable portion being pivotally mounted to said fixed portion for pivoting about a pivot axis; and a resilient member having a resilient force and releasably engaging one of said actuator bracket and said fixed portion to releasably fix the position of said movable portion about said fixed portion, said engagement being released when an external force having a sufficient magnitude to overcome said resilient force is applied to said movable portion whereby said movable portion pivots about said pivot axis to move between a normal operating position and a break-away position closer to the side of the vehicle, said resilient member comprising a plate spring, wherein said plate spring includes a central portion having an opening and a plurality of radially portions extending outwardly from said central portion, each of said portions including a first engagement element, said first engagement elements of said resilient member releasably engaging said one of said fixed portion and said actuator bracket.

29. The break-away vehicle exterior rearview mirror system according to claim 28, wherein one of said actuator bracket and said fixed portion having a pivot member, said pivot member including said resilient member.

30. The break-away vehicle exterior rearview mirror system according to claim 29, wherein said actuator bracket includes said pivot member, said movable portion and said pivot member pivoting about said pivot axis when said external force is applied.

31. The break-away vehicle exterior rearview mirror system according to claim 29, wherein said resilient member includes an opening and an annular rim at said opening, said rim seating said resilient member on said pivot member.

32. The break-away vehicle exterior rearview mirror system according to claim 29, wherein said resilient member is rotatably coupled to said pivot member by a key.

33. The break-away vehicle exterior rearview mirror system according to claim 29, wherein said fixed portion includes said pivot member whereby said resilient member and said pivot member remain stationary with said fixed portion when said movable portion is pivoted about said pivot axis, and said resilient member releasably engaging said actuator bracket.

34. The break-away vehicle exterior rearview mirror system according to claim 28, wherein said engagement element releasably engage said fixed portion.

35. The break-away vehicle exterior rearview mirror system according to claim 34, wherein said fixed portion includes second engagement elements, said first engagement elements of said resilient member releasably engaging said second engagement elements of said fixed portion and disengaging from said second engagement element of said fixed portion when said external force overcoming said resilient force is applied to said movable portion.

36. The break-away vehicle exterior rearview mirror system according to claim 28, wherein said fixed portion includes an annular wall, said annular wall having a plurality of second engagement elements, said first engagement elements of said resilient member releasably engaging said second engagement elements of said fixed portion to releasably engage said fixed portion.

37. The break-away vehicle exterior rearview mirror system according to claim 28, wherein at least one of said fixed member and said actuator bracket comprises one of a glass filled nylon material and a polypropylene material.

38. A break-away vehicle exterior rearview mirror system suitable for use on a vehicle, said system comprising:

an exterior rearview mirror assembly including a movable portion having a reflective element housed in said movable portion, said exterior rearview mirror assembly further including a fixed portion adapted for mounting to a vehicle, said movable portion being pivotally mounted to said fixed portion about a pivot axis; and a resilient member generating a resilient force, said resilient force urging one of said movable portion and said fixed portion into releasable engagement with said resilient member and releasing said engagement when an external force having sufficient magnitude to overcome said resilient force is applied to said movable portion whereby said movable portion pivots about said pivot axis between a normal operation position and a break-away position closer to the side of the vehicle, said resilient member including a first engagement element, said fixed portion including a second engagement element, said first engagement element for reasonably engaging said second engagement element on said fixed portion, said resilient member comprising a plate spring, wherein said plate spring includes at least two radially extending arms, each of said arms including a first engagement element.

39. The break-away vehicle exterior rearview mirror system according to claim 38, wherein said first engagement elements of said spring flex when said external force is applied whereby said movable portion and said fixed portion maintain their relative spacing along said pivot axis when said movable portion is pivoted about said pivot axis.

40. The break-away vehicle exterior rearview mirror system according to claim 38, wherein each of said first engagement elements comprises one of a detent and an indent.

41. The break-away vehicle exterior rearview mirror system according to claim 40, wherein each of said first engagement elements comprises a detent.

42. The break-away vehicle exterior rearview mirror system according to claim 41, wherein each of said detents includes a V-shaped cross-section.

43. The break-away vehicle exterior rearview mirror system according to claim 38, wherein said rearview mirror assembly having a pivot member, said movable portion pivotally mounted to said fixed portion by said pivot member, said plate spring including a central opening, and said pivot member extending though said central opening.

44. The break-away vehicle exterior rearview mirror system according to claim 43, wherein said plate spring includes an annular rim at said central opening, said rim seating said resilient member on said pivot member.

* * * * *